United States Patent [19]

Martin et al.

[11] 4,384,816
[45] May 24, 1983

[54] DUMP TRUCK

[75] Inventors: John C. Martin, Toronto; William C. McKee, Willowdale, both of Canada

[73] Assignee: Diesel Equipment Limited, Toronto, Canada

[21] Appl. No.: 199,114

[22] Filed: Oct. 20, 1980

[51] Int. Cl.³ .............................................. B60P 1/28
[52] U.S. Cl. .................... 414/492; 298/1 B; 298/14; 298/22 R; 414/510
[58] Field of Search ............ 298/22 R, 22 P, 1 B, 298/1 R, 12, 14, 16, 22 C, 13, 17 R, 19 R, 22 F, 22 J, 22 D; 280/401; 296/26, 29, 184; 414/492, 510, 425, 679, 419, 421, 728; 105/261 R, 261 A, 270, 269

[56] References Cited

U.S. PATENT DOCUMENTS

| 2,621,814 | 12/1952 | Lisota | 298/22 D X |
| 3,022,111 | 2/1962 | Hutchinson | 298/22 R X |
| 3,827,753 | 8/1974 | Pitts | 298/1 B |
| 4,111,485 | 9/1978 | Martin et al. | 298/1 B |

FOREIGN PATENT DOCUMENTS 990762  6/1976  Canada .................. 298/12

Primary Examiner—Frank E. Werner
Attorney, Agent, or Firm—Fetherstonhaugh & Co.

[57] ABSTRACT

In a dump truck, the most efficient way of raising the container body is to apply a lifting force to the end of the body remote from the pivot point. In some applications it is difficult to do so because of height restrictions and it is particularly difficult to do so in a telescoping container body in which the end of the container body which is remote from the pivot point moves in relation to the pivot point. The present invention overcomes this difficulty by mounting the extensible ram in a position remote from its upright position and providing a mechanism for pivoting it to its required upright position prior to its operation as a hoist. In a telescopic container body, the extensible ram is normally stored in freeboard space disposed below the front section of the container body and is raised into an upright position at the front end of the telescoped body in response to movement of the front section from its extended position to its retracted position. The power supplied to the jacking ram and to the telescoping ram is controlled so that the telescoping ram cannot be activated when the jacking ram is activated and vice versa.

8 Claims, 8 Drawing Figures

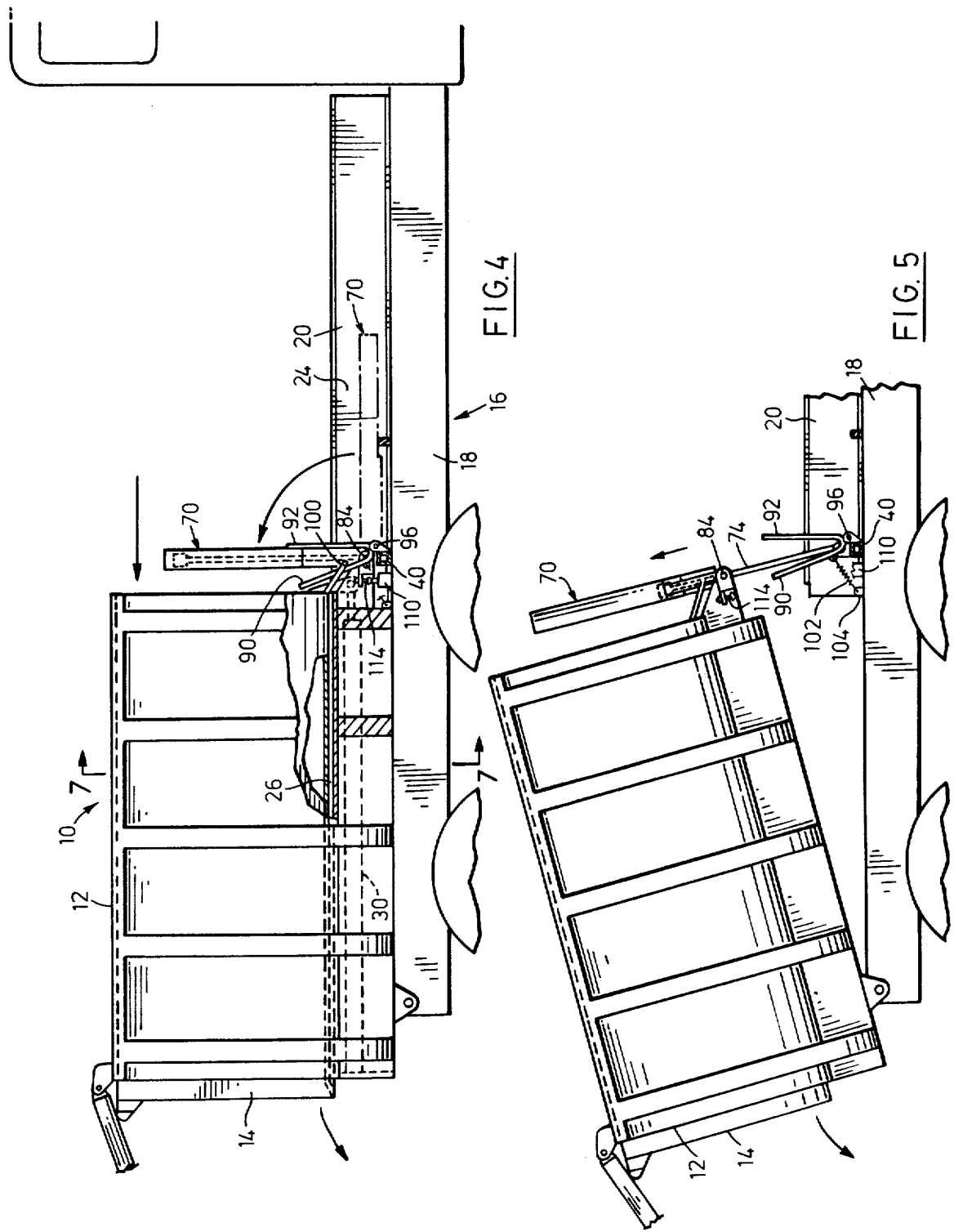

DUMP TRUCK

BACKGROUND OF INVENTION

This invention relates to dump trucks. In particular this invention relates to a dump truck in which the jacking mechanism is movable between an inobtrusive storage position and an operable position for jacking to effect dumping of the load from its container body.

The improved jacking mechanism is particularly suitable for use in a telescopic container body of a dump truck.

DESCRIPTION OF PRIOR ART

A telescopic container body for a dump truck is disclosed in U.S. Pat. No. 4,111,485, dated Sept. 5, 1978, John C. Martin et al. In this prior patent a hydraulic drive unit is provided for raising and lowering the container body when in its telescoped configuration. One end of the hydraulic drive unit is mounted on the chassis below the back section of the container body and the other end is mounted on the back section of the container body substantially mid-way between the front and back ends of the back section. This type of hoist mechanism is the type which is generally used to raise long container bodies in which the front end of the container body is elevated a substantial distance above the chassis in use. When the jacking mechanism is located in this fashion, it is necessary to provide a very powerful hydraulic mechanism because very little mechanical advantage is provided during the initial expansion of the ram. This is a very serious drawback to this type of mechanism because the minimum mechanical advantage is available at the time when the load which must be raised is at its maximum.

In conventional dump trucks which have a short container body, the jacking hoist is generally located in an upright configuration at the front end of the container body, with the result that it can be expanded under conditions which provide substantially the maximum mechanical advantage which can be obtained in the raising of the container body. This mechanism cannot, however, be used with long container bodies because of the height to which the front end of the container body must be raised in order to obtain dumping.

The difficulties of the prior art described above have now been overcome by providing an extensible ram which is movable between an inobtrusive position when not in use for jacking and an upright position for jacking.

SUMMARY OF INVENTION

According to one aspect of the present invention there is provided in a dump truck having a telescopic container body mounted on its chassis for telescopic movement when substantially horizontally oriented between an extended configuration and a retracted configuration and for pivotal movement between a raised position and a lowered position when in the retracted configuration, the front section having a front end and a back end, the back section having a front end and a back end, the improvement comprising a freeboard chamber between the front section of the body and the chassis when the body is in the elongated configuration, a longitudinally elongated extensible ram having first and second sections movable relative to one another between an extended configuration and a retracted configuration, said first section of said ram being pivotably mounted on said chassis in said freeboard chamber proximate said front end of said back section when said back section is in said lowered position, said second section of said ram being pivotably mounted on said back section proximate the front end thereof whereby said ram may pivot between a storage position extending in said freeboard chamber to permit telescoping movement of the container body thereabove and an upright position in which it is extendable to move the contracted container body between its lowered and raised positions for dumping.

BRIEF DESCRIPTION OF THE DRAWINGS

The invention will be more clearly understood after reference to the following detailed specification read in conjunction with the drawings wherein.

FIG. 4 is a side view similar to FIG. 3 showing the telescopic container body in the retracted configuration prior to dumping;

FIG. 5 is a side view similar to FIG. 4 showing the container body elevated for dumping;

DESCRIPTION OF PREFERRED EMBODIMENT

Figure 3:
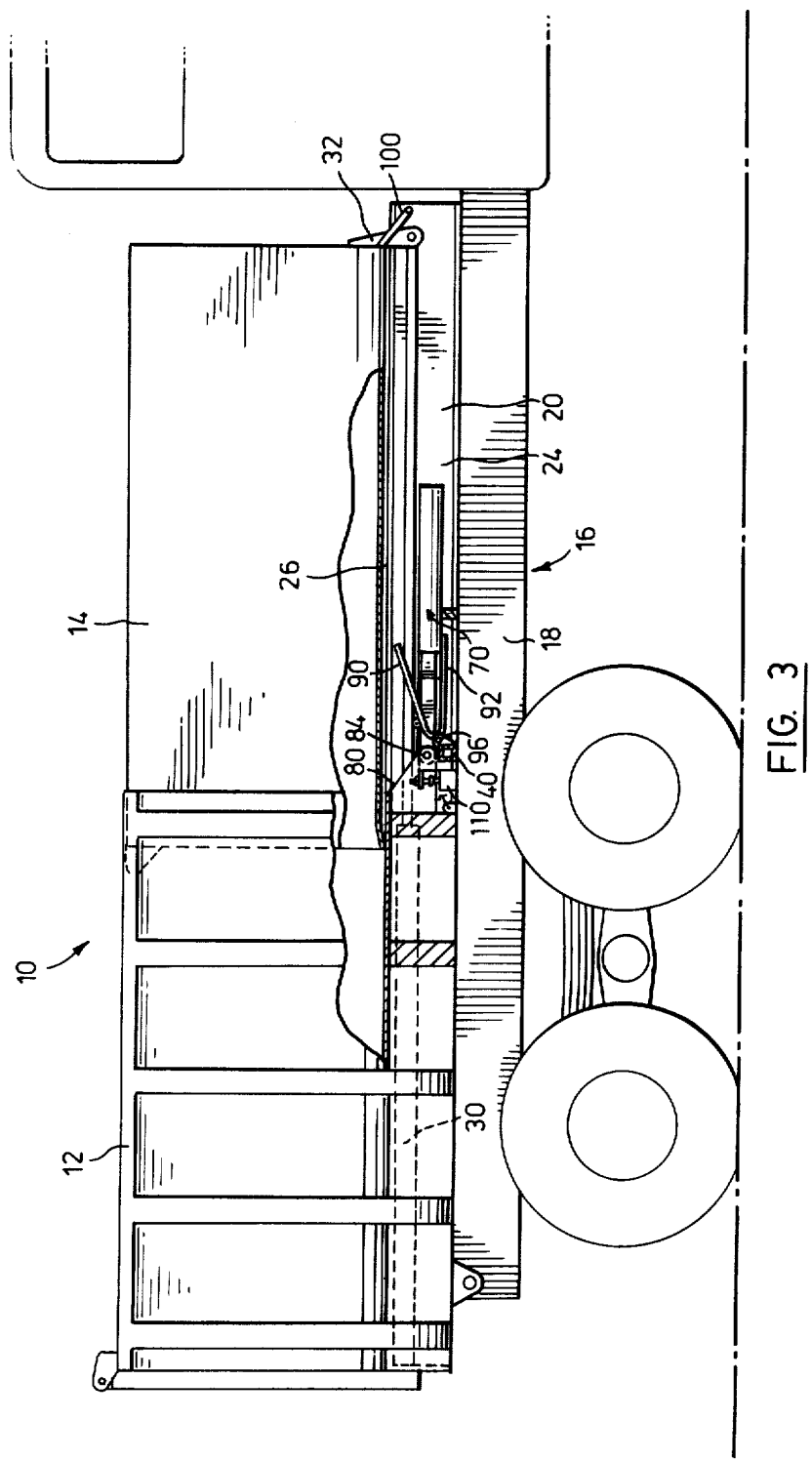
FIG. 3 is a partially sectioned side view of a telescopic container body on a truck arranged in the extended configuration.
Figure 6:
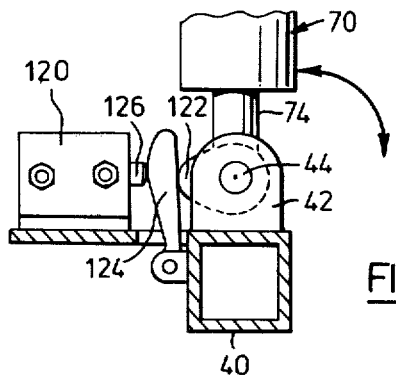
FIG. 6 is a sectional view taken along the line 6—6 of FIG. 2.

With reference to FIG. 3 of the drawings, the reference numeral 10 refers generally to a telescopic container body which consists of a back section 12 and a front section 14. The reference numeral 16 refers generally to the chassis of a truck which comprises a pair of longitudinally extending frame members 18 upon which longitudinally elongated support rails 20 are mounted in a spaced parallel relationship to provide a freeboard space 24 below the front section 12 of the container body and the longitudinal frame members 18. The front section 14 has longitudinally elongated slides 26 mounted thereon which are aligned with the rails 20 and slide therealong as the front section moves between its extended and retracted positions.

Telescoping of the front section 14 with respect to the back section 12 is achieved by means of an extensible ram 30, one section of which is secured with respect to the back section 12 and the other section of which is connected to brackets 32 mounted at the front end of the first section 14.

A transverse beam 40 is mounted in the support rails 20 and extends transversely therebetween at the end of the freeboard space proximate the front end of the back section 12 of the container body. Lugs 42 are mounted on the beam 40 and project upwardly therefrom. A pivot pin 44 is mounted in the lugs 42 and has an axis 46. As will be described hereinafter, the lugs 42 and the pivot pin 44 connect one end of the jacking ram 70 to the chassis.

The extensible ram 70 comprises a housing 72 and a shaft 74. The shaft 74 is movable relative to the housing in response to expansion and contraction of the ram. The housing 72 has a collar 76 secured adjacent one end thereof from which a pair of arms 78 project forwardly. The arms 78 are pivotally mounted on a bracket generally identified by the reference numeral 80 which is fixed to the back section 12 proximate the front end thereof. The arms 78 are pivotally connected to the brackets 80 by means of pivot pins 82 which have a pivotal axis 84.

Figure 1:
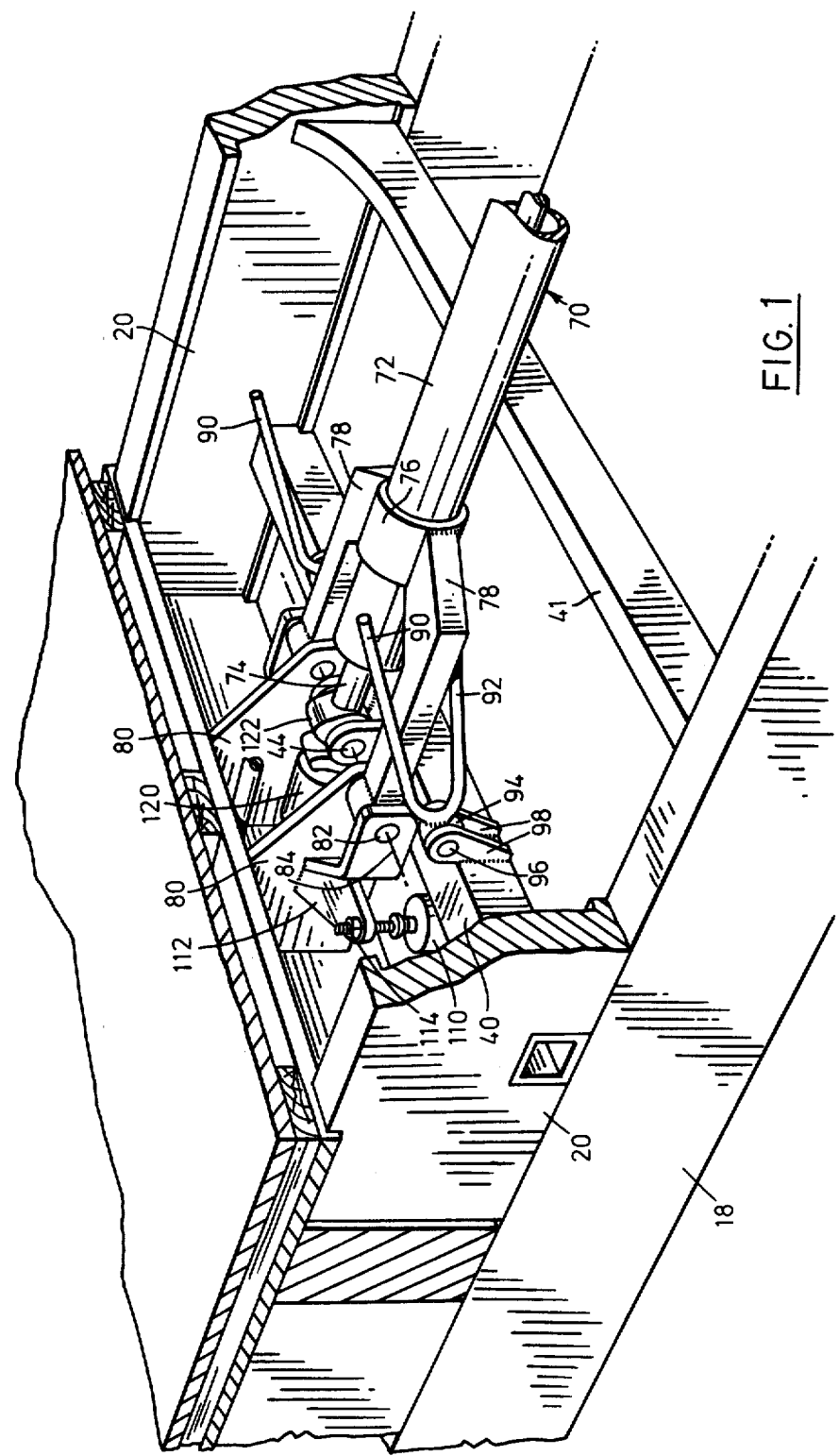
FIG. 1 is a pictorial view showing the extensible ram, partially sectioned, located in an inobtrusive position in the freeboard space provided in the chassis of the vehicle.
Figure 2:
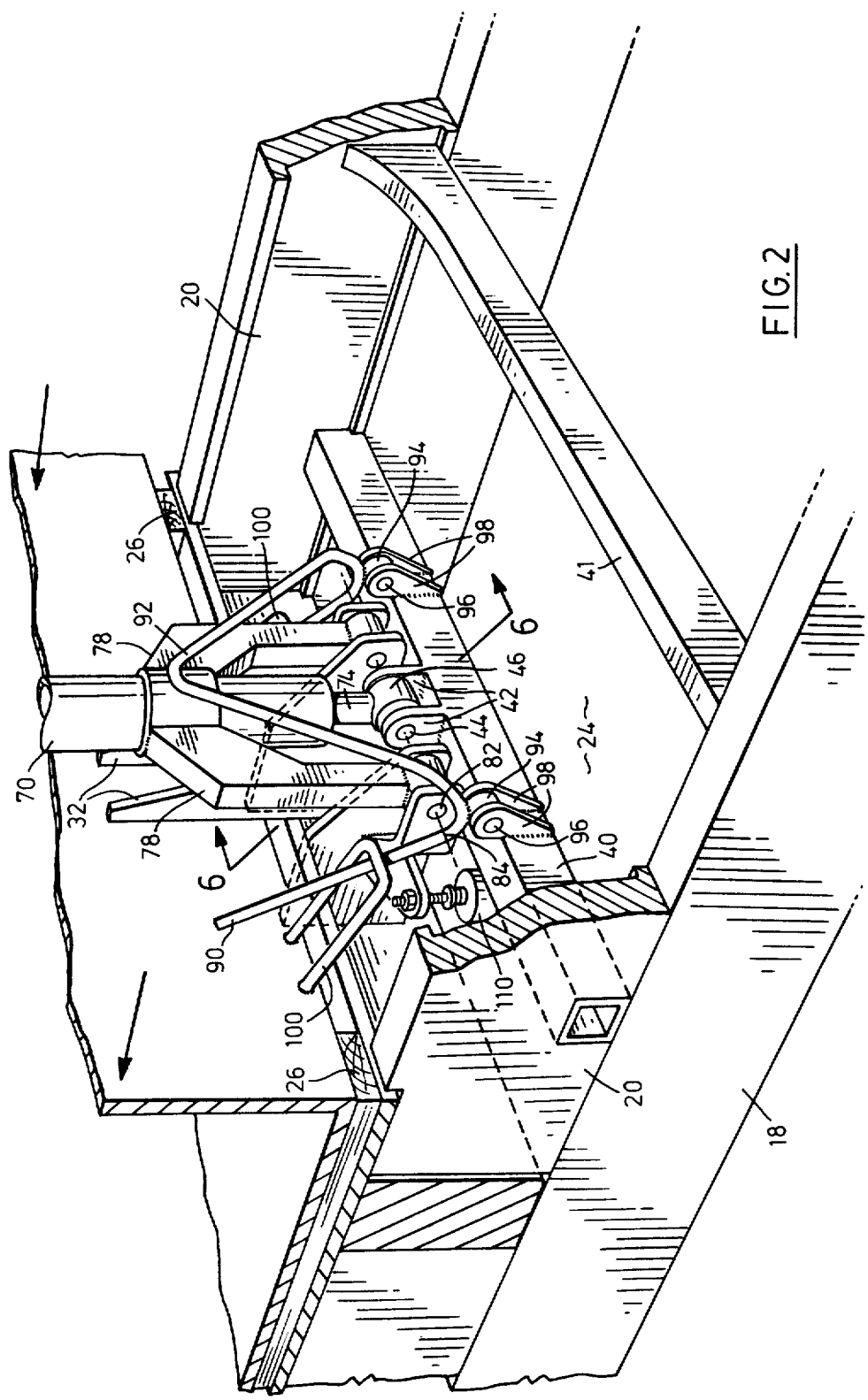
FIG. 2 is a partially sectioned pictorial view similar to FIG. 1 showing the extensible ram in an upright configuration.

As shown in FIGS. 1 and 2 of the drawings, the axes 46 and 84 are axially aligned when the telescopic container body is in its lowered position. This axial alignment is necessary to permit movement of the ram between the storage position in which it extends within the freeboard space 24 and the raised position in which it must be located for jacking purposes.

A transverse beam 41 extends between the rails 20 and underlies and supports the ram 70 in a generally horizontal plane in the storage position.

The movement of the ram 70 between the storage position and the upright position is effected in response to movement of the front section of the container body relative to the back section of the container body so that the ram will automatically move to the storage position as the container body is telescopically extended and will move to the upright configuration when the telescopic body is retracted to its shortened configuration. This is achieved by means of a pair of arms 90 which project from opposite ends of a wishbone-like frame 92. Bosses 94 are located at the elbows formed between the wishbone section 92 and the arms 90. The bosses 94 are pivotably mounted on pivot pins 96 which are supported by lugs 98 which are secured to the transverse beam 40. The frame 92 extends laterally between the elbows so as to underlie the extensible ram when the ram is located in the storage position with the arms 90 projecting upwardly and forwardly within the freeboard space at a level above the ram 70. A pair of elongated bars 100 are connected to the front end of the front section of the container body and extend forwardly and downwardly therefrom to form a pair of eyes extending in the freeboard space. A tension spring 102 (FIG. 5) extends from the arms 90 to a suitable mounting lug 104 supported by the chassis. The tension spring 102 serves to normally urge the wishbone frame to the upright position shown in FIGS. 2 and 5 of the drawings.

A valve 110 is mounted on the transverse beam member 40 and is a normally closed valve which is operable in the closed position to prevent operation of the telescoping drive mechanism when the container body is elevated for dumping. A lug 112 is mounted on the bracket 80 and has an actuator pin 114 projecting therefrom which is positioned to open the valve 110 when the back section 12 is in its lowered position.

A normally closed valve 120 is provided in the hydraulic circuit which controls the operation of the extensible ram 70 so that it cannot be extended until it is located in its upright position. The valve 120 is operated by a cam 122 which is an integral part of the end of the shaft 74. The cam 122 bears against a valve plate 124 which is pivotally mounted on the beam 40 for movement toward and away from the plunger 126 of the valve 120.

Figure 7:
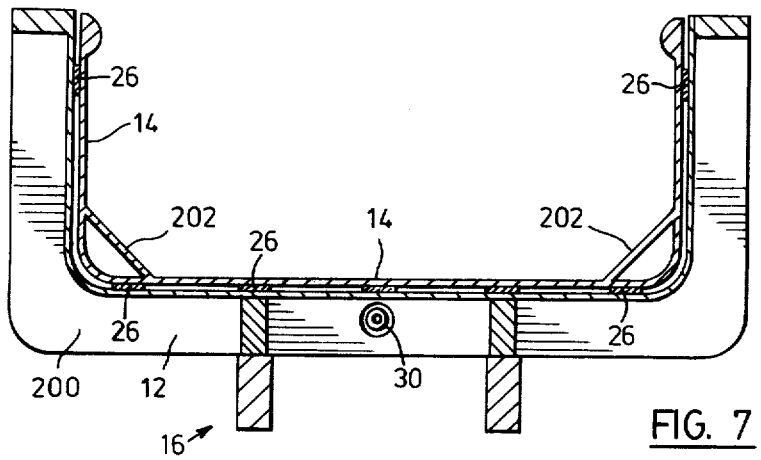
FIG. 7 is a sectional view taken along the line 7—7 of FIG. 4.

Structural details of the back section 12 and the front section 14 of the body are shown in FIG. 7. The back section 12 is reinforced by a plurality of ribs 200 which are spaced at intervals along the length thereof. By use of this construction, it has been found that it is possible to construct the back section 12 from fibreglass while retaining sufficient strength to permit the body to be used as a dump truck body. The front section 14 has gusset plates 202 which extend longitudinally at the corners between the side walls and the bottom wall. The gusset plates 202 serve to strengthen the front section to prevent outward splaying of the side walls and also serve to prevent the accumulation of material in the front section.

Figure 8:
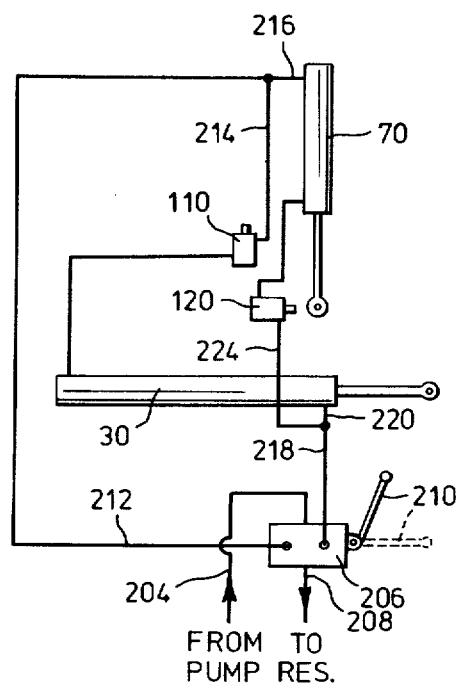
FIG. 8 is a schematic illustration of the hydraulic circuit of the present invention.

FIG. 8 of the drawings diagrammatically illustrates the hydraulic circuit. Hydraulic fluid is supplied through the supply line 204 to a master control valve 206 which communicates with the hydraulic fluid reservoir through a vent line 208. The valve 206 has a control lever 210 which is movable between the position shown in solid lines and the position shown in broken lines in FIG. 8. The valve 206 has one port connected to a conduit 212 which has branch lines 214 and 216 connected to the jacking ram 70 and the telescoping ram 30, respectively. The valve 110 is located in the branch line 214. The second port of the valve 206 is connected to a conduit 218 which has branches 220 and 224 connected to the telescoping ram 30 and the jacking ram 70, respectively. The valve 120 is located in the branch line 224.

In operation, by moving the control lever 210 to a first position the telescoping ram 30 may be activated while the jacking ram 70 is deactivated and by moving the control lever 210 to the second position, the jacking ram 70 may be activated and the telescoping ram 30 deactivated.

In use, the telescopic container body will normally be arranged in the configuration shown in FIG. 3 for use in highway transportation. In this configuration the telescoping ram 30 is extended and the jacking ram 70 is horizontally disposed in the freeboard space 24 so that it is inobtrusively located with respect to the front section 14 of the container body. When it is necessary to discharge the load from the container body, the control lever 210 (FIG. 8) is moved to the position required to activate the telescoping ram 30 to move to its retracted configuration. It will be noted that the valve 110 will only permit retraction of the telescoping ram when the back section 12 of the container body is in its lowered position, as previously described. As the front section 14 moves toward the retracted position, unloading may occur through the tailgate which has been previously released. As the front end of the front section moves rearwardly, the arms 90 of the wishbone frame extend into the eyes 100 and after the front end of the front section 14 has moved rearwardly a sufficient distance to provide clearance, the eyes 100 engage the arms 90 and cause the wishbone frame 92 to pivot about its pivot pins 96 in response to further movement of the front section toward its fully retracted position in which the axes of the pivot pins 82 and 44 are aligned to permit pivoting of the ram 70 to its upright configuration. When the front section 14 has been completely withdrawn, the jacking ram 70 is in its upright position and hydraulic fluid may be admitted to the ram 70 to raise the container body to the position shown in FIG. 5 to complete the discharging of the load. It will be noted that during the jacking operation, the ram 70 is located at the front end of the retracted body at a point where the maximum mechanical advantage can be achieved for the raising and lowering of the contracted container body. As a result, the jacking ram 70 may be of a substantially lighter weight construction and, therefore, substantially less expensive than the jacking rams required in the mechanism described in U.S. Pat. No. 4,111,485. After the dumping operation has been completed, the controls may be operated to retract the jacking ram 70 so that the container body and the jacking ram will return to the position illustrated in FIG. 4. Thereafter, the telescoping ram 30 may be activated to cause the front section 14 of the container body to move forwardly. The front end of the front section of the container body engages the arms 90 of the wishbone construction as it is driven forwardly and it engages the ram 70 so as to drive the ram 70 to return it to the storage configuration. The eyes 100 are proportioned to engage the arms 90 of the wishbone frame to ensure that the ram 70 is lowered gently to its storage position.

From the foregoing it will be apparent that the dump truck constructed in accordance with the preferred embodiment described above employs a jacking ram mechanism which may be of substantially lighter weight construction and, therefore, substantially less expensive than that required in the dump truck described in U.S. Pat. No. 4,111,485. This serves to substantially reduce the cost of the drive mechanism. These and other advantages of the structure of the present invention will be apparent to those skilled in the art.

We claim:

1. In a dump truck having a telescopic container body which consists of a front section and a back section, said container body being mounted on a chassis for telescopic movement when substantially horizontally oriented between an extended elongated configuration in which the front section extends forwardly from the back section and a contracted configuration and for pivotal movement between a raised position and a lowered position when in the contracted configuration, the front section having a front end and a back end and the back section having a front end and a back end, the front section having a front wall at the front end thereof; and means for telescoping said container body when it is horizontally oriented the improvement comprising:

(a) a freeboard chamber between the front section of the body and the chassis when the body is in the elongated configuration, (b) a longitudinally extensible ram having first and second sections and being operable to move the first and second sections relative to one another between an extended configuration and a retracted configuration, said first section of said ram being pivotably mounted on said chassis in said freeboard chamber forwardly from said front end of said back section when said back section is in said lowered position, said second section of said ram being pivotably mounted on said back section forwardly from the front end thereof whereby said ram may pivot between a storage position in which it extends forwardly from said front end of said back section within said freeboard chamber to permit telescoping movement of the container body thereabove and an upright position in which it is disposed forwardly from said front wall of the front section when said sections are in the retracted configuration such that the ram is extensible to move the contracted container body between its lowered and raised positions for dumping.

2. A dump truck as claimed in claim 1 having means for automatically moving said extensible ram between said storage position and said upright position in response to movement of said container body sections between their elongated and retracted configuration.

3. A dump truck as claimed in claim 2 in which said ram is hydraulically activated and in which means is provided for preventing extension of said ram until it is located in said upright position.

4. A dump truck as claimed in claim 3 wherein the first section of the ram and the second end of the ram are pivotably mounted for rotation about first and second axes which are coincidental when in said retracted configuration to permit pivoting between the storage position and the upright position and in which said first and second axes are longitudinally spaced from one another upon extension of said ram so as to retain the second section in an upright configuration during extension and retraction of the ram.

5. In a dump truck having a container body mounted on a chassis for telescopic movement between an elongated and a contracted configuration when horizontally oriented and for pivotal movement between a raised position and a lowered position when in the contracted configuration, and means for telescoping the container body when it is horizontally oriented the container body having a front section and a back section, the front section extending forwardly from the back section when in the extended configuration, the front and back sections each having a front end and back end, and front section having a wall at its front end, the improvement comprising:

(a) a freeboard chamber between the front section of the body and the chassis when the body is in the elongated configuration, (b) an extensible ram having a first section and a second section each of which has a proximal end and a distal end, the distal end of the first section being arranged to telescope with respect to the proximal end of the second section, first pivot mounting means at the proximal end of the first section, second pivot mounting means at the proximal end of the second section, said ram being movable between a retracted position in which the first and second pivot mounting means are disposed proximate of one another and a second extended position in which the first and second pivot mounting means are spaced a substantial distance from one another, said first pivot mounting means being connected to said chassis in said freeboard chamber forwardly from the front end of the back section to permit the proximal end of the first section to pivot about a first axis with respect to the chassis, the second pivot mounting means being connected to the back section to permit the proximal end of the second section to pivot about a second axis which is disposed forwardly from the front wall of the front section when in said contracted configuration whereby said ram may pivot between a storage position in which it extends forwardly from said front end of said back section within said freeboard chamber to permit telescoping movement of the container body thereabove and an upright position in which it is disposed forwardly from said front wall of the front section when said sections are in the retracted configuration such that the ram is extendible to move the retracted container body between its lowered and raised positions for dumping.

6. A dump truck as claimed in claim 5 wherein said first and second axes are coincident when said extensible ram is in said retracted position.

7. A dump truck comprising:
   (a) a chassis having a driver compartment at one end thereof;
   (b) a telescopic container body mounted on said chassis, said body comprising a front section and a back section each having a front end and a back end, the front section being mounted to telescope with respect to the back section and having means for telescoping the front section with respect to the back section between an elongated configuration in which the front end of the front section is located proximate the driver compartment and the contracted configuration in which the front end of the front section is spaced a substantial distance from the driver compartment to form a clearance space therebetween;
   (c) a freeboard chamber formed between the front section of the body and the chassis when the body is in the elongated configuration;
   (d) an extensible ram having a first section and a second section, the first section being pivotally connected to the chassis forwardly from the front end of the back section, the second section being pivotably connected to the back section at the front end thereof, the pivotal connections of the first and second sections being arranged to permit the extensible ram to pivot from a horizontally oriented storage position in which it extends forwardly within said freeboard chamber and an upright position in which it extends within the clearance space and means for moving said ram between said storage position and said upright position as required in use, said ram being extensible when in said upright position to elevate the contracted container body for dumping.

8. A dump truck as claimed in claim 7 in which said pivotal connections are axially aligned when said extensible ram is in a retracted configuration to facilitate pivoting between said storage position and said upright position.

* * * * *